(12) United States Patent
Lozin et al.

(10) Patent No.: US 10,148,433 B1
(45) Date of Patent: Dec. 4, 2018

(54) PRIVATE KEY/PUBLIC KEY RESOURCE PROTECTION SCHEME

(75) Inventors: Kirill Lozin, Belmont, CA (US); Sergei Menchenin, Foster City, CA (US)

(73) Assignee: DigitalPersona, Inc., Palm Beach Garden, FL (US)

(*) Notice: Subject to any disclaimer, the term of this patent is extended or adjusted under 35 U.S.C. 154(b) by 628 days.

(21) Appl. No.: 12/579,288

(22) Filed: Oct. 14, 2009

(51) Int. Cl.
 *H04L 9/08* (2006.01)
 *G06F 21/30* (2013.01)
 *G06F 21/31* (2013.01)

(52) U.S. Cl.
 CPC ............ *H04L 9/0825* (2013.01); *G06F 21/30* (2013.01); *G06F 21/31* (2013.01)

(58) Field of Classification Search
 USPC .......................................... 713/182–184, 193
 See application file for complete search history.

(56) References Cited

U.S. PATENT DOCUMENTS

| | | | |
|---|---|---|---|
| 5,742,807 A | 4/1998 | Masinter | |
| 6,249,866 B1* | 6/2001 | Brundrett et al. | 713/165 |
| 6,378,071 B1 | 4/2002 | Sasaki et al. | |
| 6,463,535 B1 | 10/2002 | Drews | |
| 6,607,136 B1* | 8/2003 | Atsmon et al. | 235/492 |
| 6,697,947 B1* | 2/2004 | Matyas et al. | 713/182 |
| 6,983,365 B1 | 1/2006 | Douceur et al. | |
| 7,003,672 B2 | 2/2006 | Angelo et al. | |
| 7,143,445 B1 | 11/2006 | Ishiguro et al. | |
| 7,155,745 B1 | 12/2006 | Shin et al. | |
| 7,319,751 B2 | 1/2008 | Kirichenko | |
| 7,398,399 B2 | 7/2008 | Palliyil et al. | |
| 7,954,151 B1 | 5/2011 | Nisbet et al. | |
| 2002/0023213 A1* | 2/2002 | Walker et al. | 713/168 |
| 2002/0038296 A1 | 3/2002 | Margolus et al. | |
| 2002/0107877 A1 | 8/2002 | Whiting et al. | |
| 2003/0021417 A1 | 1/2003 | Vasic et al. | |
| 2003/0028761 A1 | 2/2003 | Platt | |
| 2003/0051154 A1 | 3/2003 | Barton et al. | |
| 2003/0065941 A1* | 4/2003 | Ballard et al. | 713/201 |
| 2003/0188180 A1 | 10/2003 | Overney | |
| 2004/0022390 A1 | 2/2004 | McDonald et al. | |
| 2004/0133657 A1 | 7/2004 | Smith et al. | |
| 2004/0143713 A1 | 7/2004 | Niles et al. | |
| 2004/0148306 A1 | 7/2004 | Moulton et al. | |
| 2004/0158730 A1 | 8/2004 | Sarkar | |

(Continued)

OTHER PUBLICATIONS

"2.2.4 What is a digital envelope?," RSA Laboratories, http://www.rsa.com/rsalabs/node.asp?id=2184, accessed Oct. 9, 2009, 2 pages.

*Primary Examiner* — Benjamin E Lanier
(74) *Attorney, Agent, or Firm* — HIPLegal LLP; Judith Szepesi

(57) ABSTRACT

A method and apparatus of enabling access to a resource secured with a shared access control mechanism is provided. The method includes providing a public key and an authentication protected private key for a user. The private key is released to the user after receiving correct authentication. In one embodiment, the authentication may be one or more of a password, pass phrase, biometric, and smart card. The private key may be used to release the shared access control mechanism for the resource. In one embodiment, a plurality of users may have their private key provide access to the shared access control mechanism.

20 Claims, 10 Drawing Sheets

(56) References Cited

U.S. PATENT DOCUMENTS

| | | | |
|---|---|---|---|
| 2004/0168058 A1 | 8/2004 | Margolus et al. | |
| 2004/0193904 A1 | 9/2004 | Asoh et al. | |
| 2004/0236761 A1 | 11/2004 | Both | |
| 2005/0027757 A1 | 2/2005 | Keissig et al. | |
| 2005/0076066 A1 | 4/2005 | Stakutis et al. | |
| 2005/0108240 A1 | 5/2005 | Bolosky et al. | |
| 2005/0114686 A1* | 5/2005 | Ball et al. | 713/193 |
| 2005/0131939 A1 | 6/2005 | Douglis et al. | |
| 2005/0131961 A1 | 6/2005 | Margolus et al. | |
| 2005/0132382 A1 | 6/2005 | McGuire et al. | |
| 2005/0138081 A1 | 6/2005 | Alshab et al. | |
| 2005/0177603 A1 | 8/2005 | Shavit | |
| 2005/0195660 A1 | 9/2005 | Kavuri et al. | |
| 2005/0226059 A1 | 10/2005 | Kavuri et al. | |
| 2006/0173792 A1* | 8/2006 | Glass | 705/75 |
| 2006/0233361 A1* | 10/2006 | Hasegawa et al. | 380/42 |
| 2007/0150948 A1 | 6/2007 | De Spiegeleer | |
| 2008/0059495 A1 | 3/2008 | Kiessig et al. | |
| 2008/0256326 A1 | 10/2008 | Patterson et al. | |
| 2008/0294860 A1 | 11/2008 | Stakutis et al. | |
| 2009/0089337 A1 | 4/2009 | Perlin et al. | |
| 2009/0178144 A1 | 7/2009 | Redlich et al. | |
| 2009/0282055 A1* | 11/2009 | Grant | 707/100 |

* cited by examiner

PRIVATE KEY/PUBLIC KEY RESOURCE PROTECTION SCHEME

FIELD OF THE INVENTION

The present invention relates to protection of a resource and more particularly to providing access to a secured resource.

BACKGROUND

Data encryption is ubiquitous. Files, segments, and entire hard drives are often encrypted in order to protect the data on those media. In general, disk encryption is done using a symmetric key. The symmetric key is only known to the data owner. The owner can be sure that no one else can access the data, unless the data owner provides them the symmetric key. However, this has numerous problems. First, the user must share the symmetric key in order to allow access to the resource by another person. Furthermore, it is difficult for administrators since the user for whom a device is to be provisioned must be there, or the symmetric key must be sent to the user which is a security risk.

SUMMARY

A method and apparatus of enabling access to a resource secured with an access control mechanism is provided. The method includes utilizing a public key and an authentication protected private key for a user. The private key may be used to release the shared access control mechanism for the resource. The private key is released to the user only after receiving correct authentication. In one embodiment, a plurality of users may have their private key provide access to the shared access control mechanism. In one embodiment, a plurality of users' private keys may be required for access to the shared access control mechanism.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The method and apparatus described is a method of securing a resource, such that the resource may be made accessible to multiple users, and may be securely provisioned for access, without the presence of any of those users. This is accomplished without the users sharing a single access key. In the prior art, when multiple users wanted to access a shared resource, a symmetric key or the like would be shared between all the users. This is disadvantageous because it requires the presence of one of the holders of the symmetric key in order to add a new user. Furthermore, the symmetric key stored on the system must be stored in a secure location, which provides further difficulties.

In contrast, the system of the present invention, in one embodiment, can add a new user to the secured resource without the presence of any of the other users, can store the keys without additional security measures, and can enable multiple users to share a secured resource without sharing the access keys to that resource. Furthermore, the system can provision with the private key which is protected. This enables the administrator, or the provisioning system, to store the private key on the provisioned system itself, without making the private key available to the administrator. Furthermore, in one embodiment, the private key may be stored in one or more authentication tokens, such as smart cards or biometrics, which release the key upon authentication. These advantages and the use of the system for provisioning differentiate the present system from cryptographic envelope technology.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
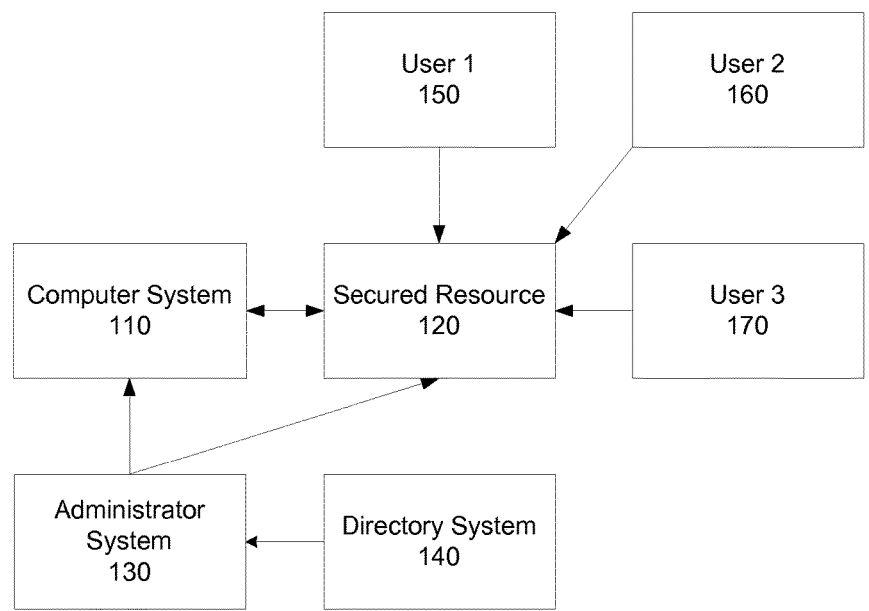
FIG. 1 is a system diagram showing one embodiment of a relationship between the various systems.

FIG. 1 is a system diagram showing one embodiment of a series of computing systems which may be used with the present invention. There is a secured resource 120. In one embodiment, the secured resource may be provisioned by administrator using administrator system 130. In one embodiment, the secured resource may be secured on the fly at the time of provisioning the first user, and no administrator is needed. The secured resource 120 may be provisioned for access by one or more users 150, 160, 170. Each user has an associated public/private key pair (P/PK). In one embodiment, the P/PK may be available on the resource, on a separate authentication mechanism (e.g. a smart card, biometric reader, etc.), or an administrator may obtain the P/PK from a directory system 140, such as a Lightweight Directory Access Protocol (LDAP) based system. Alternative means of obtaining the P/PK pair may be used. The P/PK pair includes a public key, and a secured private key. The private key is secured such that only the user associated with the private key can access the private key. This enables the secured private key to be openly stored, or provided to an administrator while remaining secure.

The secured resource 120 may be a hard drive, a portion of a hard drive, a database, a remote storage mechanism, or any other resource which users may wish to access and which can be secured. The secured resource 120 may be part of a computer system 110, such as a hard drive or a file resident on the computer system 110.

In one embodiment, a non-secured resource may be converted into a secured resource 120 while maintaining access for the users (150, 160 and/or 170) that had previously used the resource. This may be done, in accordance with one embodiment of the invention, without the presence of any of the users and in one embodiment without an administrator. There has been a long-felt need for the ability to secure an in-use resource, in a manner that provides continuing access to the users already utilizing the resource. This provides a significant advantage over conventional systems.

The secured resource 120 may also be pre-provisioned for access, for one or more indicated users. There has been a long-felt need for provisioning a secured resource without the presence of the user(s) for whom the resource is provisioned. Furthermore, in one embodiment provisioning can include storing the protected private key on the resource itself, providing immediate access to the provisioned resource to the user. Currently provisioning either requires a lack of security, or the presence of the user to whom access will be provided. Additionally, new users may be added to a secured system, such that the new users can access the secured resource. This ability to add users at any time is advantageous.

Figure 2:
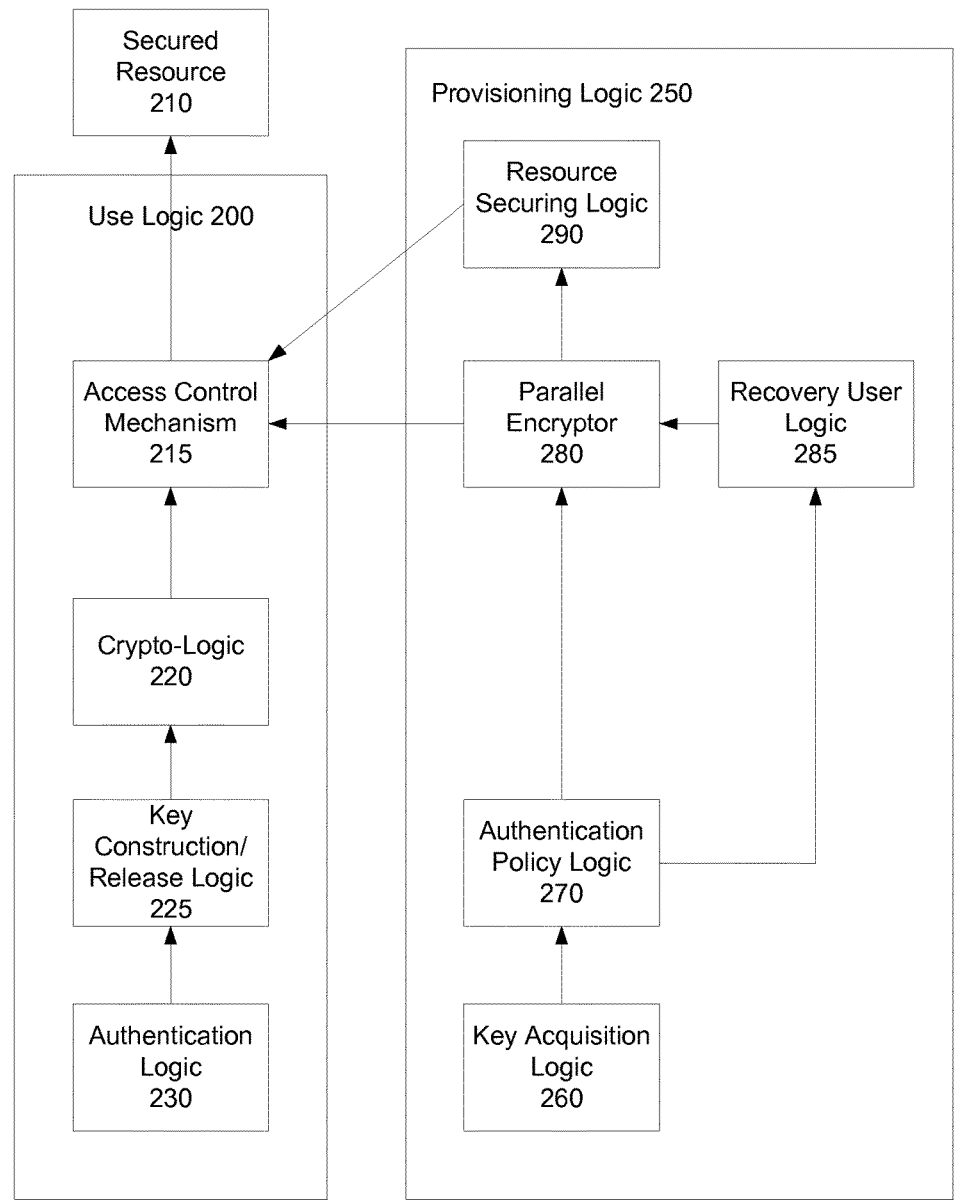
FIG. 2 is a block diagram of one embodiment of secure resource protection.

FIG. 2 is a block diagram of one embodiment of secure resource protection. The system includes provisioning logic 250 and use logic 200. In one embodiment, provisioning logic 250 may reside on an administrative system, separate from the secured resource 210. In another embodiment, both the use logic 200 and provisioning logic 250 may be resident on a computer system that includes the secured resource 210. In one embodiment, provisioning logic 250 may be implemented in hardware and/or software.

Provisioning logic 250 includes key acquisition logic 260. Key acquisition logic ensures that each of the users to be provisioned has a private/public key pair, in which the Private Key is secured. The securing of the private key may be encryption with a user password. In one embodiment, the key acquisition logic 260 makes the public key available, and ensures that a copy of the private key is stored such that the use logic 200 can access it by decrypting with password or by authenticating with a token. In one embodiment, the private key may be stored on a token, which is accessible through an authentication.

Authentication policy logic 270 sets the requirements for authentication. For example, authentication policies may require multiple separate authentications, multiple types of authentication, particular types of authentication (e.g. biometric instead of password), etc. In one embodiment, authentication policy logic 270 may set a combination of authentications, e.g. at least two users must be together to get access to the secured resource, or a user must validate in at least two (of potentially three or more available) ways.

Parallel encryptor 280 encrypts the access control mechanism in parallel with the public keys of each of the users who are provisioned to access the system. Parallel encryptor 280 may further receive the public keys of additional uses that are given access rights to the secured resource, to include in the parallel encryption at any time.

In one embodiment, parallel encryptor 280 further includes encrypts the access control mechanism with the recovery user's public key as well. Recovery user logic 285 generates the public key associated with recovery user. The recovery user logic 285 then stores the authentication, in one embodiment a one-time password, needed to obtain the private key needed to decrypt the access control mechanism on the basis of the recovery key. In one embodiment, the policy associated with the recovery key is that it is able to decrypt without any other authentications or users. In one embodiment, however, authentication policy logic 270 may also set the complexity, length, and type requirements for the authentication of private keys and/or the recovery user key.

Resource securing logic 290 in one embodiment generates or obtains access control mechanism 215 which is used to control access to secured resource 210. In one embodiment, access control mechanism 215 provides indirect access to secured resource. Additional authentications or actions (not shown) may also be required. Once the resource securing logic 290 applies access control mechanism 215 to secured resource 210, and access control mechanism is encrypted by parallel encryptor 280, the system is provisioned.

Use logic 200 provides functionality to enable access to the secured resource 210. Authentication logic 230 verifies the user's identity, in accordance with authentication policies set by policy logic 270.

Key construction/release logic 225 releases the private key if the authentication logic 230 indicates that the necessary level of authentication has been achieved. In one embodiment, the key resides on the computer system on which the secured resource 210 is available. Alternatively, the key may reside on an external device, such as a biometric reader or smart card which provides authentication. In one embodiment, key construction/release logic 225 constructs the private key from key segments released by different mechanisms. In one embodiment, the system may require a subset of possible segments to work. For example, a single user may have key segments authenticated with (1) a first password, (2) a pass phrase, (3) a fingerprint, (4) an iris scan, (5) a smart card. The authentication logic may require at least two of those authentication methods to be used. The key construction/release logic 225 would then construct the key or release mechanism from the sub-sections.

Crypto-logic 220 uses the private key, from logic 225 to decrypt the access control mechanism 215. Once access control mechanism 215 is decrypted, secured resource 210 can be accessed. As noted above, there may be one or more layers of indirection between the access control mechanism 215 released by the private key and the decryption of the secured resource 215. In this way, the system enables a provisioning and a use of the system. In one embodiment, these elements may reside on multiple devices. In another embodiment, they may all reside on a single computer system or other device. In one embodiment, authentication logic 230 and key construction/release logic 225 may reside on a biometric or other authentication tool. Crypto-logic 220, access control mechanism 215 may reside on the computer system of secured resource 210. Alternative arrangements may also be implemented. The functionality of these elements of hardware and software will be described in more detail below.

Figure 3:
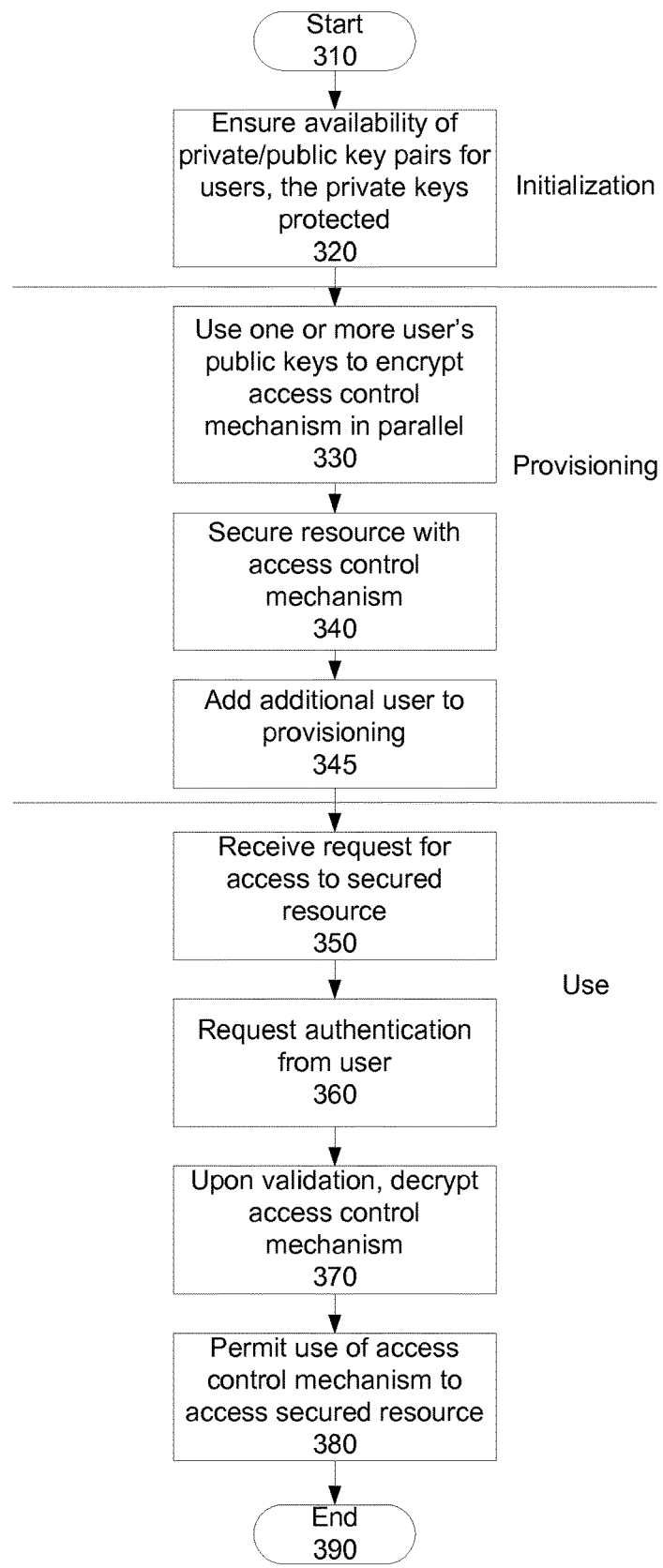
FIG. 3 is an overview flowchart showing one embodiment of the use of the system.

FIG. 3 is an overview flowchart showing one embodiment of the use of the system. There are three stages: initialization, provisioning, and use. Of course, these stages can and will occur at different times. The present flowchart is only meant to illustrate the features available in one embodiment of the present invention.

At block 320, the availability of private/public key pairs for users are determined. For these key pairs, the private key is protected via authentication. The authentication may include a password, pass phrase, biometric, smart card, or other authentication mechanism which ensures that only the user can access his or her own private key. The public key is openly available. In one embodiment, the existence of the key pair is ensured. In general, only a user can create his or her own key pair and apply appropriate authentication to protect the private key. However, once such a key pair is provided, it can be stored and made available for provisioning and other purposes, without making the private key accessible to unauthorized users.

For the next stage, provisioning, only the user's public key is needed. At block 330, the access control mechanism which is used to secure the resource is encrypted with the public keys of one or more users in parallel. Encryption in parallel, in this application, is defined to mean encryption with multiple public keys, such that any of the corresponding Private Keys will decrypt the access control mechanism. Thus, the parallel encryption ensures that each public key is utilized to encrypt the access control mechanism, in such a way that the use of any of the associated private keys will release the access control mechanism.

At block 340, the resource is secured with the access control mechanism. At this point, the resource can be considered a secured resource. Since the securing of the resource can be accomplished without the presence of the users—since only their publicly available public key is needed—this stage is referred to as provisioning.

In one embodiment, provisioning may further include adding one or more additional users to the parallel encryption, as shown in block 345. In order to do this, the secured resource is first accessed, This makes the access control mechanism available for encryption with the new public key, in addition to the prior public keys, in parallel. Thus, a secured resource can be further provisioned to add additional authorized users at any time.

The next stage is the use of the secured resource. At block 350 a request for access to the secured resource is received from a user. At block 360, authentication is requested from the user. If the authentication is correct, the user's private key is released. The user's private key may be stored on the secured resource, on an authentication hardware device, or elsewhere. The authentication may take place on the secured resource, a connected hardware device, or elsewhere. In one embodiment, the private key is received from outside the system, and only its successful use indicates that the authentication was valid.

At block 370, upon validation, the access control mechanism is decrypted, using the user's private key. At block 380, the access control mechanism can be used to access the secured resource. This figure illustrates the stages from initial preparation, through provisioning (or additional of new users), and use of a secured resource. The process described provides a simple way of provisioning a resource for secured use, in a way that does not need the presence of the users for whom the resource is provisioned, and does not require the sharing of secret data among multiple users.

Figure 4:
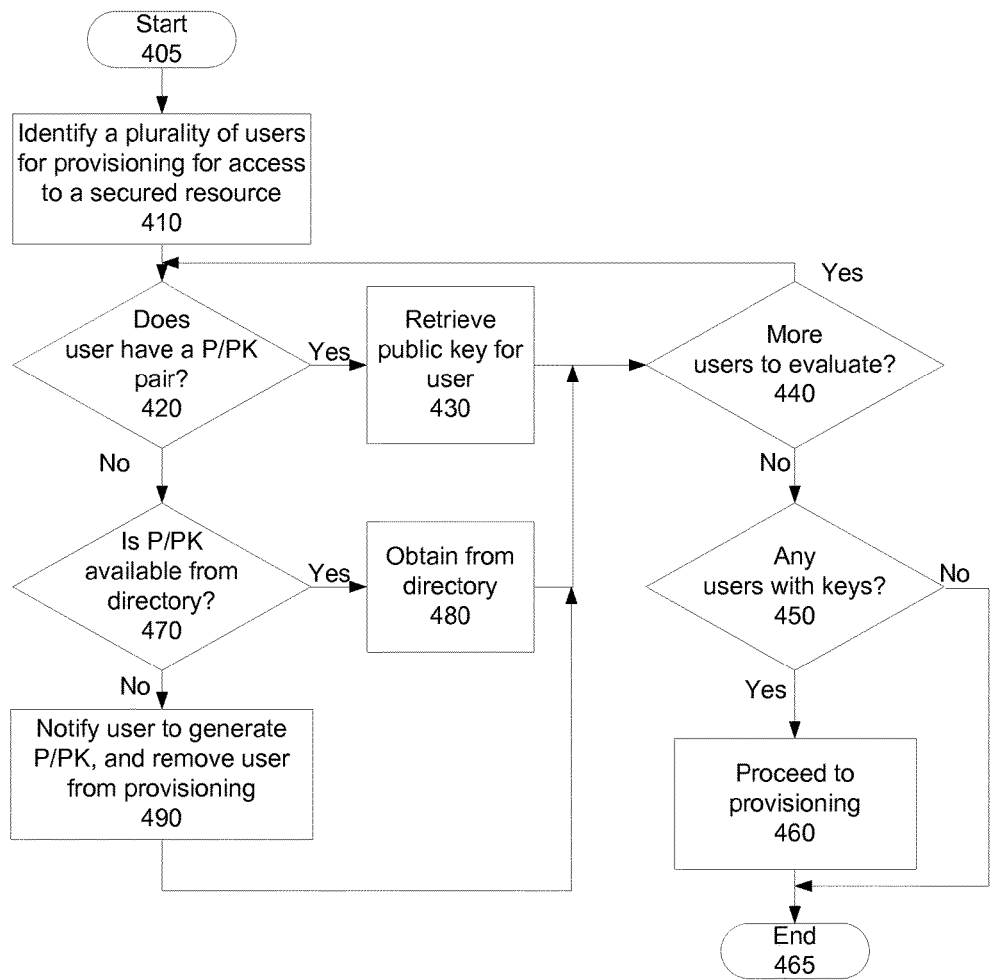
FIG. 4 is a flowchart of one embodiment of obtaining keys used to provisioning a secure resource for one or more users.

FIG. 4 is a flowchart of one embodiment of obtaining keys used to provisioning a secure resource for one or more users. At block 410, the process identifies a plurality of users to be provisioned for access to the resource. In one embodiment, a single user may be similarly provisioned. However, one of the advantages of the present system is that provisioning can be done for a plurality of users simultaneously, and without the presence of those users.

At block 420, the process determines whether each user to be provisioned has a public key/private key pair (P/PK pair). Each user to be provisioned must have a P/PK pair, with at least the public key available to the system for provisioning. The private key may be on an authentication device such as a biometric reader, or encrypted with a password. Therefore, if one or more users do not have a P/PK pair, the system cannot provision them. In one embodiment, the determination is whether the P/PK pair is on the resource to be secured, or on the administrative system. If the user has a P/PK pair, the user's public key is retrieved. In one embodiment, only the public key is made available to the administrator/system for provisioning. In one embodiment, there is no need to supply the authenticated private key. However, if the private key is provisioned onto the secured resource, then the system can be self-contained, requiring no access to outside hardware or resources for access.

At block 440, the process evaluates whether there are more users to be included in the provisioning. In one embodiment, this process is performed for each user in turn.

If there are further users to evaluate the process returns to block 420, where the determination of key availability is made for the next user. If there are no further users to evaluate, the process continues to block 450.

At block 450, the process determines whether there are any users who have P/PK key pairs, and thus who can be provisioned for. If there is at least one user who can be provisioned, the process continues to provisioning, at block 460. The process of provisioning is discussed in more detail below. The process then ends, at block 465. If no users with keys were found, the process ends at block 465.

In one embodiment, when a resource is to be provisioned an additional recovery user identity may be provisioned as well. This is discussed in more detail below. When this is the case, block 450 may be skipped, since there is always at least one valid user who has an available key pair, the recovery user.

If at block 420 the process found that the user does not have a P/PK pair, the process continues to block 470. At block 470, the process determines whether the P/PK pair is available from a directory or other resource. In one embodiment, the administrator may make use of an LDAP or other system to find each user's P/PK pair. If the P/PK pair is available from the directory, either the public key or both the public key and protected private key are obtained at block 480. In one embodiment, only the public key is obtained. This may be the case when the private key is stored on an external hardware such as a smart card or biometric reader. In another embodiment, the protected private key is also obtained. By storing the authenticated private key with the secured resource, the system can be made self-contained. The process then continues to block 440, to determine whether there are any more users to evaluate.

If the user's P/PK pair is not available from a directory, the process continues to block 490. At block 490, the system notifies the user that no provisioning is possible at this time, and the user is asked to generate the P/PK pair, and provide the protected private key and the public key to the administrator. In one embodiment, the user is also removed from the provisioning. In another embodiment, the provisioning may be halted until the user provides the key. The process then continues to block 440, to determine whether there are any more users to evaluate.

In one embodiment, the protected private key and/or public key may then be stored locally. The storing may be done openly, since the public key is openly available, and the private key is protected by an authentication. This provides a significant advantage, since the secured resource need not keep a secret, or have secure storage available.

In one embodiment, the protected private key/public key pair is stored on a smart card, which may be the authentication device needed. In one embodiment, the protected private key/public key pair is stored on the system, encrypted with smartcard which may be the authentication device needed. In one embodiment, the protected private key/public key pair is stored on a biometric reader, which releases the public key when the user is authenticated via a biometric.

Figure 5:
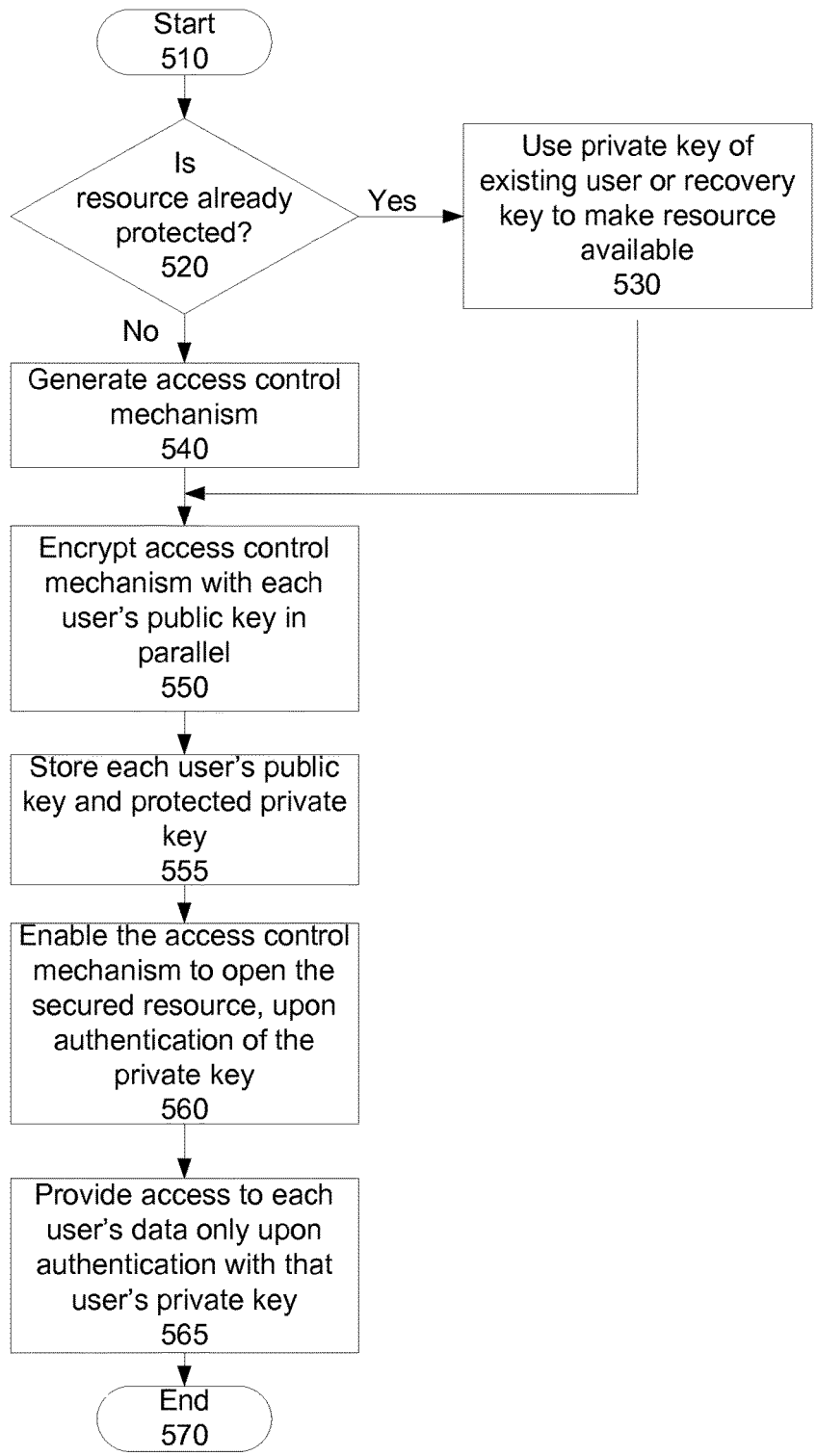
FIG. 5 is a flowchart of one embodiment of provisioning.

FIG. 5 is a flowchart of one embodiment of provisioning. The process starts at block 510, when a resource is identified for provisioning. The resource may be a computer system including a hard drive, data, a database, a storage mechanism, or another resource or resource type. Provisioning comprises setting up a resource to be a secured resource accessible by one or more users, without the presence of those users, and without sharing secret data with those users. This provides a significant advantage compared to current systems where either the users must be present for the provisioning, or a secret must be shared with those users.

At block 520 the process determines whether the resource is already secured. If so, it means that the resource is only available by use of one of the registered private keys. In that case, at block 530, the private key of an existing user who is present to release his or her key, or a recovery key used by an administrator is used to make the resource available. This places the access control mechanism, if one exists, into memory. The process then continues to block 550.

If the resource is not yet protected, an access control mechanism is generated, at block 540. The generation of the access control mechanism is not described in great detail here, as it is not key to the invention. Rather, any type of access control mechanism may be used to protect the secured resource. For example, in one embodiment the access control may be a symmetric key.

At block 550, the access control mechanism for the secured resource is encrypted in parallel with each user's public key. As noted above, parallel encryption in this context means that any one private key, associated with a public key which was used for encryption, will release the access control mechanism. In one embodiment, if the provisioning is adding new users, the access control mechanism is encrypted in parallel with the additional users' public keys, since the prior encryption of the original users' keys remains valid. In another embodiment, the access control mechanism is encrypted with the public key of all users, whether original or newly added.

At block 555, in one embodiment if not already locally available, each just provisioned user's public key and protected private key may be stored locally. These keys need not be stored in a special location, or otherwise secured, since the private keys are protected and require authentication for access.

At block 560, the system is set up so that the access control mechanism, released by the private key, opens the secured resource. In one embodiment, this is automatic when the access control mechanism is encrypted by the user's public key. In another embodiment, there may be one or more layers of abstraction between the private key decrypted access control mechanism and the actual release of the secured resource. For example, the private key may in one embodiment decrypt access to another authentication layer.

At block 565, in one embodiment, the system is set up to access to the user's own private data within the secured resource is further secured by the user's own private key. In other words, when a user gains access to the secured resource using his or her key, only the user's own data is accessible, even though the secured resource may be shared by many users. The process then ends, at block 570.

Figure 6:
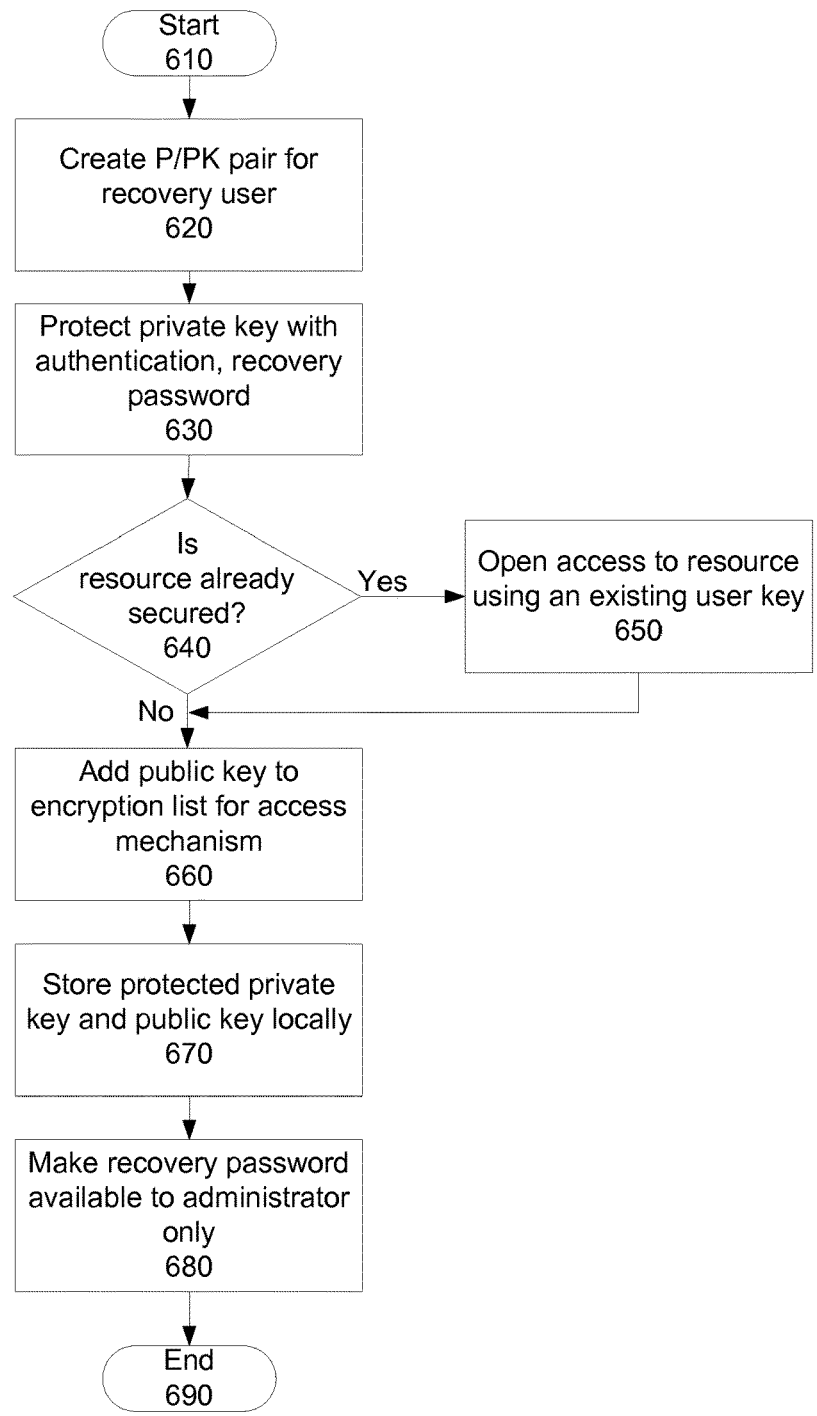
FIG. 6 is a flowchart of one embodiment of providing an administrative access mechanism to a secure resource.

FIG. 6 is a flowchart of one embodiment of providing an administrative access mechanism to a secure resource. The process starts at block 610. In one embodiment, this is done when a secured resource is initially provisioned for a user. This ensures that future administrative actions, such as adding a new user, do not require the presence of an existing user. In another embodiment, this may be done separately, prior to provisioning for a real user. In another embodiment, this feature may be added after a secure resource is secured.

At block 620, a P/PK pair is created for the recovery user. In one embodiment, a "recovery user" is an entity created to provide administrative access to a protected resource. For example, if a user forgets his or her authentication password, or a user leaves and no one has access to a protected resource, the recovery user may be used to recover access to the secured resource. Furthermore, if new users are to be added to an already secured resource, the recovery user account may be used to access the resource to enable the addition of new users.

At block 630, the private key is protected with an authentication. In one embodiment the authentication is a recovery password. In one embodiment, the recovery password is a one-time password. This means that after the recovery user ID is used once, a new recovery user ID must be set up. In another embodiment, the recovery password may remain in place after use.

At block 640, the process determines whether the resource is already secured. In one embodiment, the policy of creating a recovery user key when the initial provisioning occurs is encouraged. If the resource is already secured, the process continues to block 650, where access to the resource is opened using an existing user key. When the secured resource is a computer system, this may be part of the boot-up process. This is needed in order to provide access to the secured resource, and also to make the access control mechanism available. The process then continues to block 660. If the resource is not yet secured, the process continues directly to block 660.

At block 660, the public key of the recovery user is added to the encryption list for the access mechanism. The access mechanism for the secured resource is thus encrypted with the public key associated with the recovery user.

At block 670, in one embodiment the protected private key, and public key, are stored locally. Alternatively, the protected private key and public key may be stored elsewhere. The recovery password is then made available to the administrator only, at block 680. In one embodiment, the recovery password is securely stored on a separate system which is not connected to the system including the secured resource. The process then ends at block 690.

Figure 7:
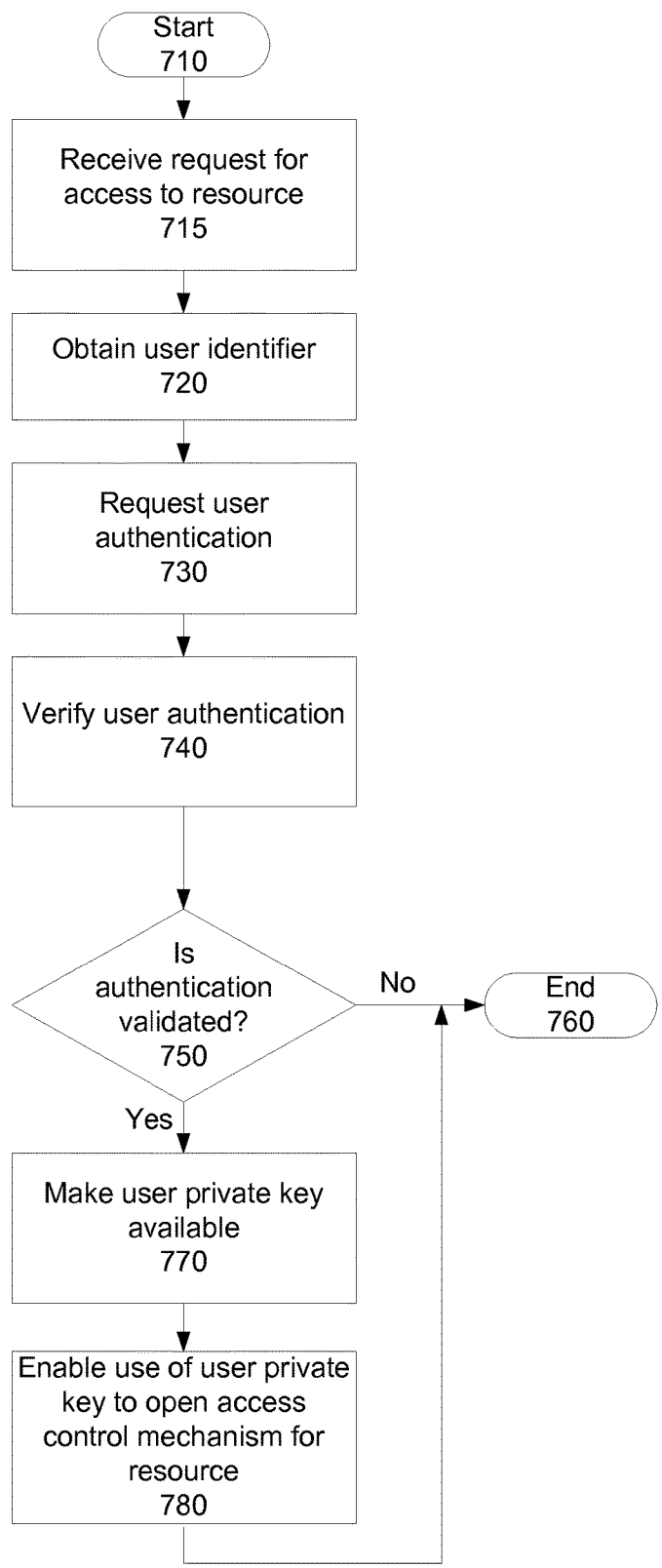
FIG. 7 is a flowchart of one embodiment of accessing the secure resource.

FIG. 7 is a flowchart of one embodiment of accessing the secure resource. At block 710, the process starts. In one embodiment, this process is available whenever a secured resource is available for access.

At block 715, the system receives a request for access to the secured resource. This request for access may be turning on a computer which has a hard drive that is a secured resource. The request may be a request to access particular data which is a secured resource, a subdirectory, a folder, a file, a remote data store, or any other entity which has been identified as a secured resource.

At block 720, the user identification is obtained. The user identification may be requested from the user (e.g. user name) or may be automatically obtained (e.g. from the system that the user is connected through). In one embodiment, this step may be skipped, and the process may work without a user identifier.

At block 730, a user authentication is requested. In one embodiment, one or more types of authentication may be requested. In one embodiment, the methods of authentication may include one or more of: biometric, password, smart card, pass phrase, or other authentication mechanism.

At block 740, the user authentication is verified. If user identification was obtained, the verification compares the user authentication to the user identifier received. If no user identification was obtained, the verification may compare to all user authentication(s) which are authorized to access the shared resource.

At block 750, the process determines whether the user authentication is validated. If it is not, the process ends at block 760, without providing access to the secured resource. Otherwise, the process continues to block 770. In one embodiment, blocks 740 through 760 may be performed by a hardware device, such as a biometric reader. In one embodiment, the system requests authentication, and receives a private key which is released by a hardware device.

At block 770, the user private key is made available. The validated authentication enables the user to access his or her private key. This private key may then be used to open the access control mechanism for the resource, at block 780. In one embodiment, the access control mechanism may be a symmetric key, which is used to encrypt the secured resource. The symmetric key may be released by the user's private key, and then may be used to provide access to the secured resource. In another embodiment, the private key may provide access to another layer of authentication, e.g. a secondary authentication which releases a third mechanism to provide access to the secured resource. There may be one or more layers of indirection between the actual access to the secured resource and the private key. In one embodiment, the types of authentication requested for releasing the private key and releasing the access control mechanism may be different (for example, one requires a biometric while the other requires a password).

Once the access control mechanism is released, providing access to the secured resource, the process ends at block 760.

Figure 8:
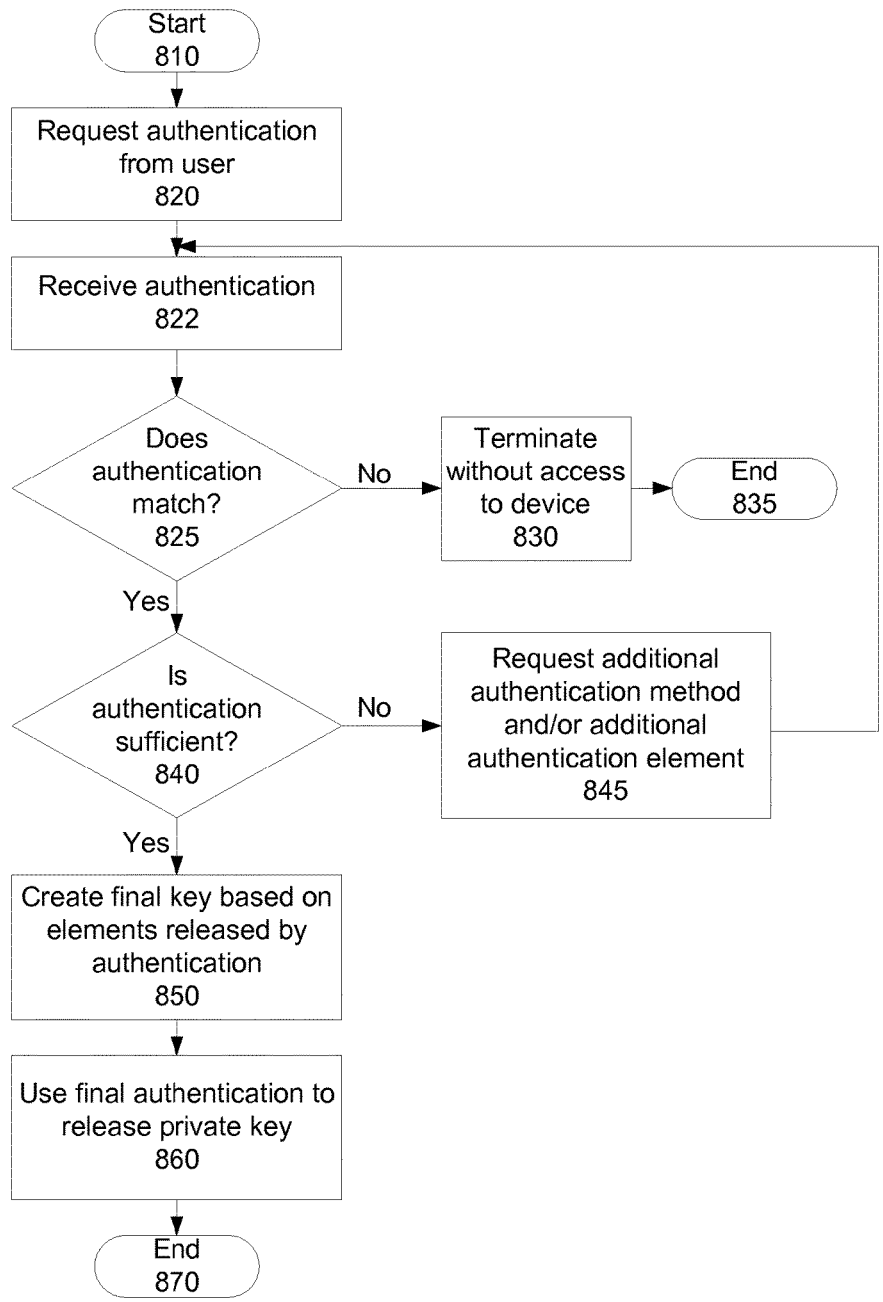
FIG. 8 is a flowchart of one embodiment of providing multi-stage authentication for secure resource access.

FIG. 8 is a flowchart of one embodiment of providing multi-factor authentication for secure resource access. The process describes the validation of an authentication. In one embodiment, this process corresponds to blocks 730 and 740 in FIG. 7, or block 360 in FIG. 3. The process starts when an access request is triggered, requiring user validation/authentication.

At block 820, authentication is requested from the user. In one embodiment, an authentication request is a pop-up box asking the user to provide authentication. In one embodiment, the authentication request may be a biometric sensor flashing or otherwise indicating an expected data input. In another embodiment, no indication may be provided.

At block 822, authentication is received from the user. In one embodiment, if no authentication is received within a preset period of time, the process automatically ends.

At block 825, the process determines whether the authentication matches. In one embodiment, the process determines whether the authentication matches the user identity provided. In one embodiment, if no user identity is provided, it determines whether the authentication matches one of the authorized users. In one embodiment, a single user may have multiple types of authentication, e.g. password, smart card, biometric. Any one of the authentications may be matched for this determination.

If it does not, the access request terminates without access to the device at block 830. The process then ends at block 835. In one embodiment, each attempt to access the resource is recorded, whether or not it is successful.

If the authentication matches, the process continues to block 840. At block 840, the process determines whether the authentication is sufficient. In one embodiment, the system may require two or more methods of authentication. In one embodiment, the methods of authentication may include passwords, pass phrases, biometrics, smart cards, and other formats. The two or more forms of authentication may be identical (e.g. two forms of biometrics, two passwords, etc.) In one embodiment, a single user may have a number of authentications (e.g. a fingerprint, a password, an iris scan, a smart card, a pass phrase). In one embodiment, the system may require two authentications, and any of the registered authentication methods associated with the user may be chosen as the two authentication methods. In another embodiment, the system may require a biometric authentication and another authentication. In that case, one of the authentications must be a biometric, prior to the system determining that the received authentication is sufficient.

In one embodiment, multiple users' authentication may be required in order to access the secured resource. In one embodiment, for example, five users may be authorized to access the secured resource, and any two of them together can access the resource. In that instance, the determination whether the authentication is sufficient, at block 840 determines whether at least two users have been successfully authenticated.

If the numbers and/or types of authentication received is not yet sufficient, the process continues to block 845. At block 845, additional authentication is requested. The process then returns to block 822 to receive the additional authentication.

If the number/type of authentication is sufficient, the process continues to block 850. At block 850, in one embodiment a final key is created. In one embodiment, the final key is a concatenation of the sub-keys released by the authentications provided. In another embodiment, this step may be skipped. In another embodiment, each of the keys released is a sub-part of a greater key, and a preset number of key elements must be released to generate a key that will decrypt the access control mechanism.

At block 860, in one embodiment the final key is used to release the user's private key. In one embodiment, instead of the final authentication being used, each authentication method is used in turn, until the key is released. In another embodiment, each authentication element is used to release a portion of the private key, and the private key is generated from those portions. In this way, the system enables various levels of security, as set by an administrator. The process ends at block 870.

Figure 9:
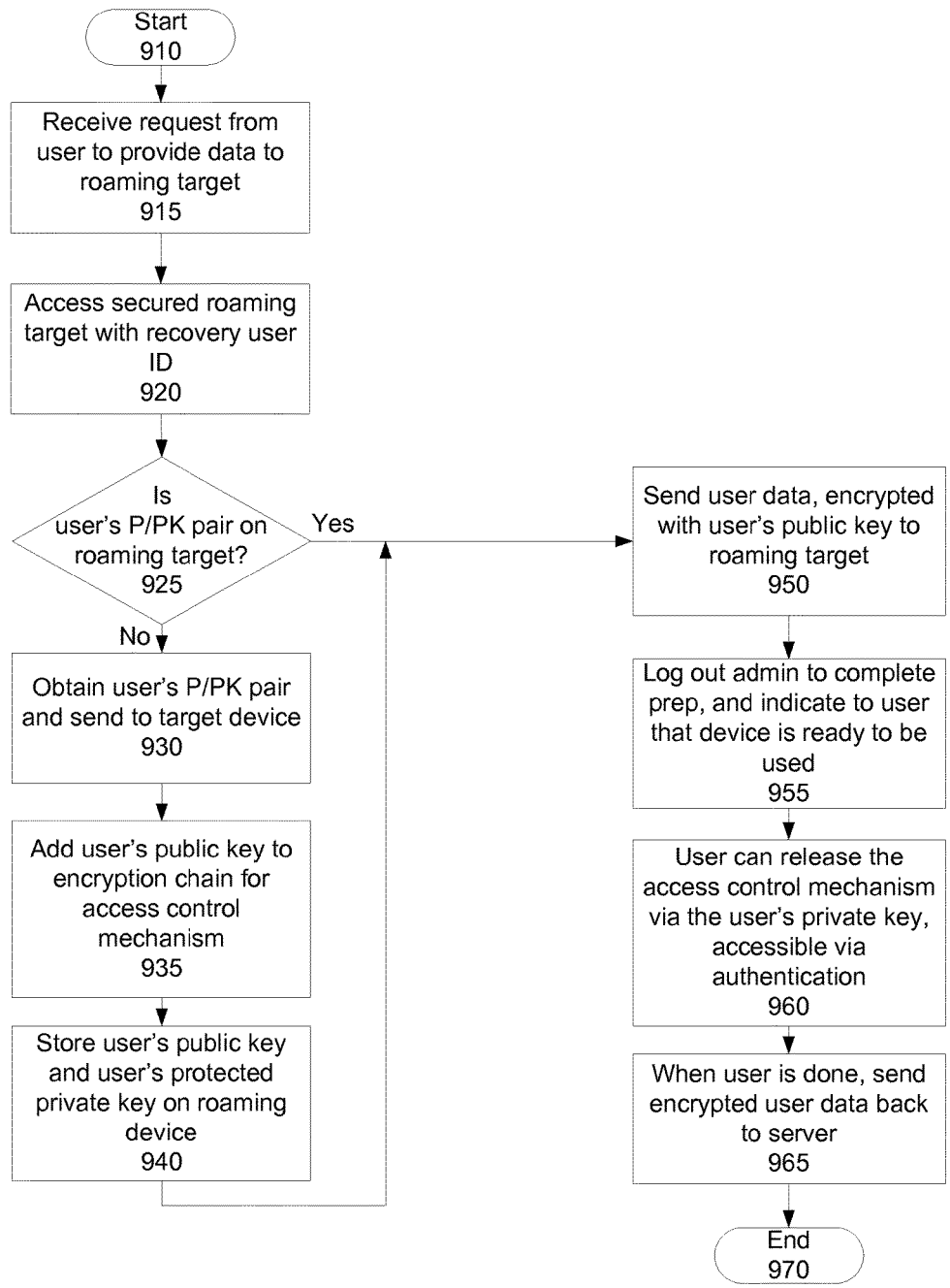
FIG. 9 is a flowchart of one embodiment of data roaming with secure resource access.

FIG. 9 is a flowchart of one embodiment of data roaming with secure resource access. Data roaming is a method to allow users to utilize any computer, and have their data available on that computer. This is especially useful in an environment where devices are regularly exchanged, or new devices are regularly brought online. For example, for a travelling user, it may be more efficient to provide data roaming, instead of having the user take a laptop computer from location to location. Data roaming generally involves an administrator, which may be a human or an automated process, providing a user's data upon request to a destination computer system. The process described here includes the provisioning of a system with a user's public key and the transmission of user data to the system by the administrator, and the use of the roaming system by the user.

At block 915, a request to provide data to a roaming target is received from a user. In one embodiment, this request may be automatically generated when an authorized roaming user logs into a system which does not have that user's data on it. In one embodiment, the administrator evaluates whether the user may be granted rights to the system. If not, the user, in one embodiment is notified, and the process ends. The process continues if the user is authorized to use the roaming system.

At block 920, the secured roaming target is accessed by the administrator with a recovery user identity. In one embodiment, this step may be skipped, if the target is either not yet secured, or is already open.

At block 925, the process determines whether the user's P/PK pair is already on the roaming target. In one embodiment, this process determines whether the user is already an authorized user on the target system (e.g. the user's public key is already in the parallel encryption chain). In one embodiment, once a P/PK pair is added to a system, it remains on that system.

If the P/PK pair is not yet on the system, the process continues to block 930. At block 930, the user's P/PK pair is obtained by the administrator. In one embodiment, for each roaming user the P/PK pair is stored in a directory or database accessible to the administrative system that enables roaming. The user's P/PK pair is sent to the target device.

At block 935, the user's public key is added to the encryption chain for the access control mechanism by the administrator. This ensures that the user will have access to the secured resource.

At block 940, in one embodiment the user's public key and private key are stored on the roaming device. This can be done without additional protections as the user's private key is protected by authentication. However, this does not exclude the option of storing it in a secure storage, on a separate device such as a smart card or biometric reader, or otherwise providing additional securing for the P/PK pair. The process then continues to block 950.

If the P/PK pair was found to be on the roaming device at block 925, the process continues directly to block 950.

At block 950, the user data, encrypted with the user's public key is sent to the roaming target by the administrator. Note that the administrator or administrative system that performs this is not able to access the user data, since it remains encrypted during the entire process. The administrator/system does not have access to the user's private key since it is protected by authentication requirements throughout the process. In another embodiment, the authorized user may pull the data instead.

At block 955, the administrator readying the data roaming is logged out of the secure resource, leaving it ready for use, and requiring user authentication. The user is then notified that the device is ready to be used. In one embodiment, the above process may be automated and no administrators or users may need to interact with the system in order to enable roaming data transfer.

At block 960, the user is able to access the roaming device by releasing the user's private key through authentication. When the user is done using the roaming device he or she may choose, at block 965 to send the encrypted user data back to the server. The process then ends at block 970.

Figure 10:
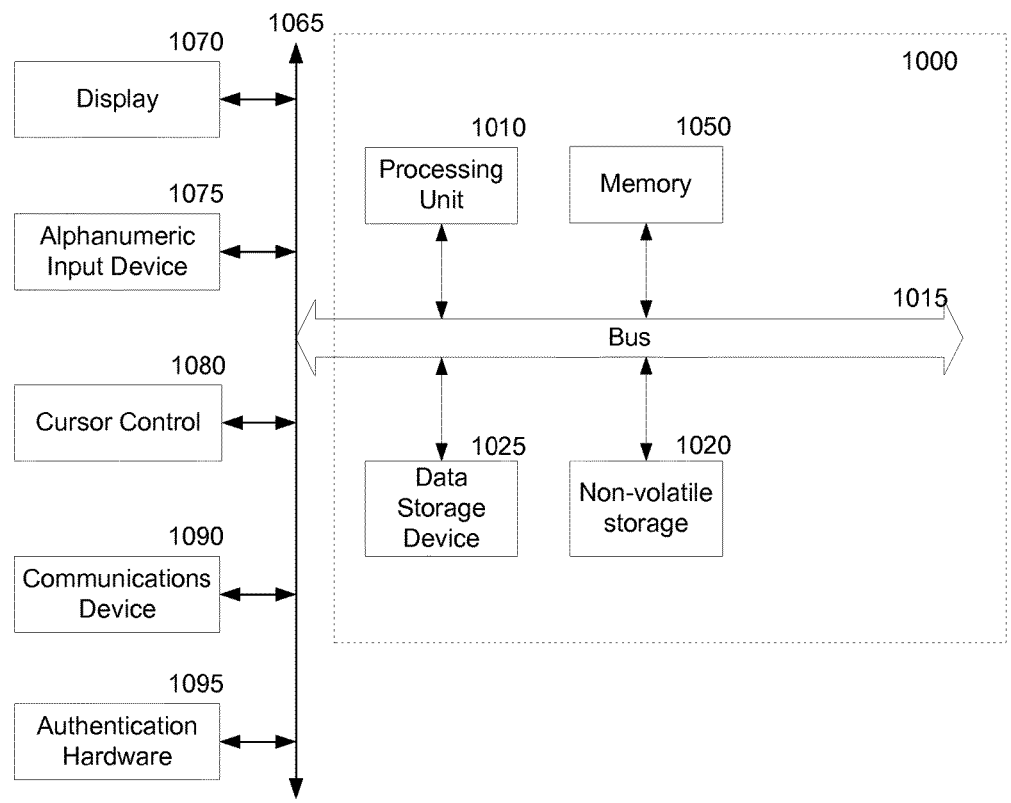
FIG. 10 is a block diagram of a particular machine which may be used with the present invention.

FIG. 10 is a block diagram of a particular machine which may be used with the present invention. It will be apparent to those of ordinary skill in the art, however that other alternative systems of various system architectures may also be used.

The data processing system illustrated in FIG. 10 includes a bus or other internal communication means 1015 for communicating information, and a processor 1010 coupled to the bus 1015 for processing information. The system further comprises a random access memory (RAM) or other volatile storage device 1050 (referred to as memory), coupled to bus 1015 for storing information and instructions to be executed by processor 1010. Main memory 1050 also may be used for storing temporary variables or other intermediate information during execution of instructions by processor 1010. The system also comprises in one embodiment a read only memory (ROM) and/or static storage device 1020 coupled to bus 1015 for storing static information and instructions for processor 1010, and a data storage device 1025 such as a magnetic disk or optical disk and its corresponding disk drive, or Flash memory or other storage which is capable of storing data when no power is supplied to the system. Data storage device 1025 in one embodiment is coupled to bus 1015 for storing information and instructions.

The system may further be coupled to a display device 1070, such as a cathode ray tube (CRT) or a liquid crystal display (LCD) coupled to bus 1015 through bus 1065 for displaying information to a computer user. An alphanumeric input device 1075, such as a keyboard including alphanumeric and other keys, may also be coupled to bus 1015 through bus 1065 for enabling a user to communicate information and command selections to processor 1010. An additional user input device may also be included. One such user input device is cursor control device 1080, such as a mouse, a trackball, stylus, or cursor direction keys may be coupled to bus 1015 through bus 1065 for communicating direction information and command selections to processor 1010, and for controlling cursor movement on display device 1070.

Another device, which may optionally be coupled to computer system 1000, is a communication device 1090 for accessing other nodes of a distributed system via a network. The communication device 1090 may include any of a number of commercially available networking peripheral devices such as those used for coupling to an Ethernet, token ring, Internet, or wide area network, personal area network, wireless network or other method of accessing other devices. The communication device 1090 may further be a null-modem connection, or any other mechanism that provides connectivity between the computer system 1000 and the outside world. Note that any or all of the components of this system illustrated in FIG. 10 and associated hardware may be used in various embodiments of the present invention.

In one embodiment, authentication hardware 1095 may further be coupled to bus 1065. Authentication hardware may include one or more of biometric readers (both embedded into computer system and detachable), smart cards and associated readers, etc. that can be used for authentication and release of the private key. In one embodiment, authentication hardware may further include the user's protected private key, or a subpart of a key.

It will be appreciated by those of ordinary skill in the art that the particular machine which embodies the present invention may be configured in various ways according to the particular implementation. The control logic or software implementing the present invention can be stored in main memory 1050, mass storage device 1025, or other storage medium locally or remotely accessible to processor 1010.

It will be apparent to those of ordinary skill in the art that the system, method, and process described herein can be implemented as software stored in main memory 1050 or read only memory 1020 and executed by processor 1010. This control logic or software may also be resident on an article of manufacture comprising a computer readable medium having computer readable program code embodied therein and being readable by the mass storage device 1025 and for causing the processor 1010 to operate in accordance with the methods and teachings herein.

The present invention may also be embodied in a handheld or portable device containing a subset of the computer hardware components described above. For example, the handheld device may be configured to contain only the bus 1015, the processor 1010, and memory 1050 and/or 1025. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 1010, a data storage device 1025, a bus 1015, and memory 1050, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 1010. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   securing a resource with an access control mechanism;
   provisioning the secured resource for access by:
   identifying a plurality of users for provisioning, wherein the plurality of users may or may not be present for provisioning,
      identifying any users of the plurality of users having a public key in the provisioning system,
      identifying any users of the plurality of users having a public key from a public/private key in a directory external to the provisioning system,
      notifying the users in the plurality of users that do not have the public/private key pair that provisioning is unavailable and instructing the users to generate a key pair for access to the resource, and provide the key pair to an administrator,
      modifying the plurality of users for provisioning to include only users that have a public/private key pair but not including users without the public/private key pair, to yield a plurality of users that can be provisioned, and
      constructing a public key collection of the public keys in the provisioning system and the public keys retrieved from the directory,
   encrypting the access control mechanism for the plurality of users that can be provisioned, with the plurality of user public keys in the public key collection;
   having each of the plurality of user private keys associated with the plurality of user public keys protected by an authentication mechanism, such that the access control mechanism is released to make available the secured resource with the user private key, and the user private key is released by the authentication mechanism; and
   in order to add access to the resource to an additional user, decrypting the access control mechanism using an existing private key, adding a new public key of the additional user to the plurality of user public keys, and encrypting the access control mechanism using the plurality of public keys including the new public key of the additional user.

2. The method of claim 1, wherein the authentication mechanism comprises one or more of the following: a biometric, a password, challenge response, and a smart card.

3. The method of claim 2, wherein any of the plurality of authentication mechanisms may be used to release the private key.

4. The method of claim 2, wherein at least two of the available authentication mechanisms are used to release the private key.

5. The method of claim 1, wherein there is another layer of security between the access control mechanism and the protection of the secure resource.

6. The method of claim 1, further comprising:
   utilizing a second user private key, associated with a second user public key, such that a combination of the user private key and the second user private key are utilized to decrypt the access control mechanism.

7. The method of claim 1, further comprising:
   encrypting the access control mechanism with a plurality of user public keys in parallel, enabling access to the secure resource to a plurality of users, each user able to decrypt the access control mechanism with the user's private key.

8. The method of claim 7, further comprising:
   generating a recovery user, the recovery user having a public key and a private key, the private key secured by a passcode known to the administrator, such that the administrator can use the recovery user identity to access the secured resource,
   the administrator comprising one of a human or an automated process.

9. The method of claim 8, wherein the passcode is a one-time passcode.

10. An apparatus comprising:
    a secured resource protected by an access control mechanism;

a first processor implementing a crypto-logic designed to provision the secured resource, the first processor comprising:
a provisioning logic to identify a first plurality of users for provisioning,
the provisioning logic further to collect a first one or more public keys from within the provisioning logic and a second one or more public keys from a directory for at least one of the first plurality of users,
the first processor further to modify the first plurality of users to include only users that have a public/private key pair to yield a plurality of users that can be provisioned, and notifying the keyless users that provisioning is unavailable and instructing the users to generate a key pair, and providing the key pair to an administrator;
a second processor implementing key construction/release logic to enable a user in the plurality of users that can be provisioned to release a protected private key, associated with the user public key, when a user is successfully authenticated, the private key used to decrypt the access control mechanism and thereby provide access to the secured resource;
the first processor to enable addition of a new user to the access control mechanism by decrypting the access control mechanism using a provisioned private key, and parallel encrypting the access control mechanism with an updated plurality of user public keys including the public key of the new user.

11. The apparatus of claim 10, wherein the authentication mechanism comprises one or more of the following: a biometric, a password, challenge response, and a smart card.

12. The apparatus of claim 11, wherein any of the plurality of authentication mechanisms may be used to release the private key.

13. The apparatus of claim 11, wherein at least two of the available authentication mechanisms are used to release the private key.

14. The apparatus of claim 11, wherein there is another layer of security between the access control mechanism and the protection of the secure resource.

15. The apparatus of claim 10, further comprising:
the key construction/release logic requiring release of a second user private key, associated with a second user public key, such that a combination of the user private key and the second user private key are utilized to decrypt the access control mechanism.

16. The apparatus of claim 10, further comprising:
the crypto-logic encrypting the access control mechanism with a plurality of user public keys in parallel, enabling access to the secure resource to a plurality of users, each user utilizing a secured private key to access the resource.

17. The apparatus of claim 16, further comprising:
the first processor implementing a recovery user logic to generate a recovery user, the recovery user having a recovery public key and a private key, the recovery private key secured by a passcode known to the administrator;
the administrator comprising one of a human or an automated process; and
the crypto-logic to include the recovery public key, such that the administrator can use the recovery private key to access the secured resource.

18. The apparatus of claim 17, wherein the passcode is a one-time passcode.

19. A method comprising:
identifying a plurality of users, wherein the plurality of users need not be present, to be provisioned for access to a secured resource;
for each user in the plurality of users, determining whether there is a public key in a provisioning system, when the user does not have the public key in the provisioning system, determining whether the user has the public key in an external directory system, and when the user does not have the public key in the external directory system, identifying the user as a keyless user;
obtaining at least one public key/private key pair for one or more users of the plurality of users to be provisioned for access to the secured resource, from the provisioning system and the external directory system;
modifying the first plurality of users to include only users that have a public/private key pair to yield a plurality of users that can be provisioned; notifying the keyless user that provisioning is unavailable, and instructing the keyless user to generate a key pair, and to provide their newly generated key pair to an administrator, wherein the private key of the key pair is provided as a protected key; and
encrypting an access mechanism to the secured resource using parallel encryption including the at least one public key for the plurality of users that can be provisioned.

20. The method of claim 19, further comprising:
including in the encryption chain a recovery user public key, the recovery user public key having an associated recovery user private key secured with a one-time passcode, the one-time passcode providing an administrator a one-time use decryption access to the resource; and
enabling the administrator to generate a new recovery user after using the one-time use decryption access to the resource.

* * * * *